United States Patent
Asrar et al.

(10) Patent No.: US 9,394,199 B2
(45) Date of Patent: Jul. 19, 2016

(54) MODIFIED FIBERS FOR USE IN THE FORMATION OF THERMOPLASTIC FIBER-REINFORCED COMPOSITE ARTICLES AND PROCESS

(71) Applicant: JOHNS MANVILLE, Denver, CO (US)

(72) Inventors: Jawed Asrar, Greenwood Village, CO (US); Thomas Burghardt, Parker, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 13/653,573

(22) Filed: Oct. 17, 2012

(65) Prior Publication Data

US 2013/0040108 A1 Feb. 14, 2013

Related U.S. Application Data

(63) Continuation of application No. 11/699,516, filed on Jan. 29, 2007, now abandoned, which is a continuation-in-part of application No. 11/645,963, filed on Dec. 27, 2006, now abandoned.

(51) Int. Cl.
| | |
|---|---|
| *C03C 25/10* | (2006.01) |
| *C08J 5/08* | (2006.01) |
| *D06M 11/00* | (2006.01) |
| *D06M 23/08* | (2006.01) |
| *D02G 3/00* | (2006.01) |

(52) U.S. Cl.
CPC ............ *C03C 25/101* (2013.01); *C08J 5/08* (2013.01); *D06M 11/00* (2013.01); *D06M 23/08* (2013.01); *D06M 2200/50* (2013.01); *Y10T 428/24372* (2015.01); *Y10T 428/2933* (2015.01); *Y10T 428/2938* (2015.01)

(58) Field of Classification Search
USPC .............. 264/131, 134, 328.18; 427/180, 201, 427/389.7
See application file for complete search history.

(56) References Cited

U.S. PATENT DOCUMENTS

| | | | |
|---|---|---|---|
| 3,312,569 A | 4/1967 | Phillips et al. | |
| 4,086,098 A | 4/1978 | Le Ruyet et al. | |
| 4,143,202 A | 3/1979 | Tseng et al. | |
| 4,241,136 A * | 12/1980 | Dereser | 428/378 |
| 4,457,970 A * | 7/1984 | Das et al. | 442/173 |
| 4,542,065 A * | 9/1985 | Gaa | 428/391 |
| 4,567,228 A * | 1/1986 | Gaa et al. | 524/588 |
| 5,322,711 A | 6/1994 | Gabor et al. | |
| 5,340,903 A | 8/1994 | Tetart et al. | |
| 5,541,238 A | 7/1996 | Yamada et al. | |
| 5,639,292 A * | 6/1997 | Hawkins | 65/443 |
| 6,419,981 B1 * | 7/2002 | Novich et al. | 427/180 |
| 2002/0055313 A1 | 5/2002 | Velpari et al. | |
| 2004/0166299 A1 | 8/2004 | Haislet et al. | |
| 2004/0209991 A1 * | 10/2004 | Piret et al. | 524/548 |
| 2005/0163998 A1 | 7/2005 | Kashikar et al. | |
| 2005/0202258 A1 | 9/2005 | Swales et al. | |
| 2006/0115642 A1 | 6/2006 | Musch et al. | |

FOREIGN PATENT DOCUMENTS

| | | |
|---|---|---|
| EP | 0 098 315 A | 1/1984 |
| EP | 0 249 927 A | 12/1987 |
| JP | 01 203247 A | 8/1989 |
| JP | 09 208268 A | 8/1997 |
| WO | 93/07097 A | 4/1993 |
| WO | 2007/074281 A | 7/2007 |

OTHER PUBLICATIONS

Jensen et al. (Hybrid Fiber Sizings for Enhanced Energy Absorption in Glass-Reinforced Composites. Army Research Laboratory. ARL-TR-3241. Jul. 2004).*
R.E. Jensen, S.H. McKnight, "Inorganic-organic fiber sizings for enhanced energy absorption in glass fiber-reinforced composites intended for structural applications," Composite Science and Technology, Mar. 2006, pp. 509-521, vol. 66.
O.W.Florke et al, "Silica," Ullmann's Encyclopedia of Industrial Chemistry, 1993, pp. 583-660, vol. A23, VCH Verlagsgeselllschaft mbH, Weinheim, Germany.
Y. Cao, J. Cameron, "Impact properties of silica particle modified glass fiber reinforced epoxy composite," Journal of Reinforced Plastics and Composites, May 1, 2006, pp. 761-769, vol. 25, No. 7.

* cited by examiner

*Primary Examiner* — Atul P. Khare
(74) *Attorney, Agent, or Firm* — Robert D. Touslee

(57) ABSTRACT

A surface-modified fibrous material is provided for incorporation in a thermoplastic matrix to form a fiber-reinforced composite article. Good binding between the fibrous material and the thermoplastic matrix is achieved through the presence of finely roughened surfaces on the fibers of nanoparticles of an inorganic material. Such nanoparticles are provided from an alkaline aqueous size composition containing the nanoparticles dispersed therein (as described). The fibrous material may be provided in continuous or discontinuous form. In a preferred embodiment glass fibers are initially provided in continuous form followed by cutting into discontinuous lengths and drying with the retention of the nanoparticles on the surfaces of the fibers. The surface-roughened fibrous material is incorporated in a thermoplastic matrix as fibrous reinforcement with the application of heat whereby the thermoplastic matrix is rendered melt processable. In preferred embodiments injection or compression molding is utilized. Improved long-fiber thermoplastics also may be formed to advantage.

34 Claims, No Drawings

MODIFIED FIBERS FOR USE IN THE FORMATION OF THERMOPLASTIC FIBER-REINFORCED COMPOSITE ARTICLES AND PROCESS

CROSS-REFERENCE TO RELATED APPLICATIONS

This application is a continuation of U.S. application Ser. No. 11/699,516 filed Jan. 29, 2007, which is a continuation-in-part of U.S. application Ser. No. 11/645,963 filed Dec. 27, 2006.

FIELD OF THE INVENTION

The subject invention pertains to the formation of improved fibers for incorporation in a thermoplastic matrix to form a fiber-reinforced composite article. Enhanced binding between the thermoplastic matrix and the glass fiber reinforcement is made possible.

DESCRIPTION OF RELATED ART

Various binders and sizing compositions are known to improve the handling characteristics of fibrous materials.

When fibers are incorporated in the continuous phase of a thermoplastic polymeric matrix material to serve a reinforcing role it is advantageous that the fibers also bind to some degree to the continuous phase of the matrix material of the resulting fiber-reinforced composite article. Otherwise, various forms of product failure may occur during use. For instance, various coupling agents commonly are being employed to help the fiber reinforcement better attach to the matrix material of the continuous phase. It is also desirable that minimal color is displayed in the final fiber-reinforced composite article.

It has been proposed to prepare an epoxy thermoset resin, which incorporates a woven continuous filament fabric, in which a sizing package including colloidal silica is applied to the woven fabric prior to the incorporation followed by vacuum assisted resin transfer molding. See, for instance, Army Research Laboratory Report No. ARL-TR-3241 (July 2004), and R. E. Jensen, S. H. McKnight, Composites Sci. Tech., Vol. 66, Pages 509 to 521 (2006).

It is an object of the present invention to provide an improved process as well as the resulting product for forming modified fibers suitable for incorporation in a thermoplastic matrix to form a fiber-reinforced composite article.

It is another object of the present invention to provide an improved process as well as the resulting product for forming a fiber-reinforced thermoplastic composite article.

It is another object of the present invention to provide fiber-reinforced composite articles which may display improved toughness combined with good color.

It is a further object of the invention to provide fiber-reinforced molded composite articles which may display good color, an improved mechanical property, and a reduced size requirement when compared to a conventional size.

These and other objects of the invention, as well as the scope, nature and utilization of the invention will be apparent to those skilled in the art from the following detailed description.

SUMMARY OF THE INVENTION

A process, as well as the resulting product, is provided for forming modified fibers having roughened surfaces suitable for incorporation in a thermoplastic matrix to form a fiber-reinforced composite article comprising:
(a) applying as a coating to the surface of a fibrous material an alkaline aqueous size composition comprising a dispersion of nanoparticles of an inorganic material, and
(b) drying said coating present on said fibrous material to provide a roughened surface on said fibrous material as the result of the presence of said nanoparticles of said inorganic material.

A process, as well as the resulting product, is provided for forming modified discontinuous glass fibers suitable for incorporation in a thermoplastic matrix and the formation of a fiber-reinforced composite article by injection or compression molding which displays an enhanced mechanical property comprising:
(a) adhering nanoparticles of an inorganic material that are dispersed in an alkaline aqueous size composition to the surfaces of glass fibers which are present in continuous form to provide finely roughened surfaces on the continuous glass fibers as the result of the presence of the nanoparticles of the inorganic material, and
(b) cutting the continuous glass fibers into discontinuous lengths while retaining the roughened surfaces on the glass fibers as the result of the presence of the nanoparticles of the inorganic material.

A process, as well as the resulting product, is provided for forming a fiber-reinforced thermoplastic composite article comprising:
(a) applying as a coating to the surface of a fibrous material an alkaline aqueous size composition comprising a dispersion of nanoparticles of an inorganic material,
(b) drying said coating present on said fibrous material to provide a roughened surface on said fibrous material as the result of the presence of said nanoparticles of said inorganic material, and
(c) incorporating said fibrous material bearing said roughened surface in a thermoplastic matrix as fibrous reinforcement with the application of heat whereby said thermoplastic matrix is rendered melt processable.

A process, as well as the resulting product, is provided for forming a discontinuous glass fiber-reinforced thermoplastic composite article comprising:
(a) adhering nanoparticles of an inorganic material that are dispersed in an alkaline aqueous size composition to the surfaces of glass fibers which are present in continuous form to provide finely roughened surfaces on the glass fibers as the result of the presence of the nanoparticles of the inorganic material,
(b) cutting the continuous glass fibers into discontinuous lengths while retaining the roughened surfaces on the glass fibers as the result of the presence of the nanoparticles of the inorganic material,
(c) extruding the discontinuous glass fibers having said finely roughened surfaces together with a thermoplastic matrix wherein the surface-attached nanoparticles of inorganic material serve to promote the secure bonding of the discontinuous glass fibers within the thermoplastic to form a material suitable for molding, and
(d) injection or compression molding said material incorporating the discontinuous glass fibers having the finely roughened surfaces to form a fiber-reinforced thermoplastic composite article which displays an enhanced mechanical property.

DESCRIPTION OF PREFERRED EMBODIMENTS

The present invention makes possible the efficient formation of quality thermoplastic fiber-reinforced composite articles wherein enhanced binding between fibrous reinforcement and the thermoplastic matrix is made possible. In accordance with the concept of the present invention, nanoparticles of an inorganic material initially are well dispersed within an alkaline aqueous size composition. The nanoparticles of an inorganic material are relatively inert under the conditions that are encountered in the size composition and commonly possess an average particle size of approximately 3 to 40 nm, preferably approximately 3 to 10 nm. Such particle size can be determined by the use of particle size analyzers that are being manufactured by companies such as Malvern of Worcestershire, United Kingdom, Beckman Coulter of Fullerton, Calif., U.S.A., and others. Inorganic nanoparticles displaying a specific surface area 300 $m^2/g$ commonly possess an average particle size of approximately 10 nm, and inorganic nanoparticles displaying a specific surface area of 650 $m^2/g$ commonly possess an average particle size of approximately 3 nm. In preferred embodiments, the nanoparticles of an inorganic material are provided as substantially amorphous spheres; however, other particle shapes are suitable for use and may have different ratios of surface areas to their sizes.

In preferred embodiments, the nanoparticles of an inorganic material are silica of the specified particle size. Representative colloidal silica nanoparticles for use in the present invention are commercially available from Eka Chemicals, Inc. of Marietta, Ga., U.S.A. under designations of Bindzil® or from Grace Davison of Columbia, Md., U.S.A. under the Ludox® designations. Other representative nanoparticles of an inorganic material suitable for use in the present invention include, but are not limited to, clays, including montmorillonite-type clays, glass, nanosized particles of metals or non-metals such as titanium dioxide, zinc oxide, barium oxide, silver, cerium gadolinium oxide, palladium, iron ferrite nanoparticles, aluminium polyphosphate, nanodiamonds, or other functionalized or unfunctionalized inorganic nanoparticles having modified or unmodified surfaces. A representative amino-functionalized clay is commercially available from the Kentucky-Tennessee Clay Company of Mayfield, Ky., U.S.A. under the Amlok 321 designation. Mixtures of the nanoparticles may be utilized.

The fibrous material suitable for incorporation in a thermoplastic matrix which is surface-roughened in accordance with the concept of the present invention may be provided in continuous or discontinuous form. For instance, the fibers can be mineral fibers or polymeric fibers which possess sufficient thermal stability to withstand the heated melt-processable thermoplastic matrix material when forming a fiber-reinforced composite article as described hereafter. High performance polymeric fibers may be utilized which possess a greater thermal stability than the thermoplastic matrix material utilized when forming a fiber-reinforced composite article. Also, carbon fibers or natural fibers may serve as the fibrous reinforcement. The fibrous material preferably comprises glass fibers. Representative glass fibers are E-glass, C-glass, A-glass, AR-glass, D-glass, R-glass, S-glass, etc. Such glass fibers can be initially supplied as long multifilamentary rovings or tows of infinite length. Single fibers thereof commonly possess average fiber diameters of approximately 2 to 50 µm, and preferably approximately 7 to 30 µm. It will be understood, however, that fiber diameters can be adjusted to meet the reinforcement requirements of specific end uses.

The nanoparticles of an inorganic material commonly are provided in the alkaline aqueous size composition when applied to continuous glass fibers in a concentration of 1 to 90 percent based on the total formulation solids, preferably in a concentration of 2 to 40 percent based on total formulation solids, and most preferably in a concentration of 5 to 40 percent based on total formulation solids. All percentages are based on the solids weight.

The alkaline pH of the size composition is obtained by the use of other size components, and may be adjusted so as to provide for the substantial dispersion of the nanoparticles of an inorganic material therein. The optimum alkaline pH is influenced by the alkaline contribution of the components present in the aqueous dispersion and commonly is within the range of 7.5 to 13, and preferably within the range of 8 to 11.

The remaining components of the alkaline aqueous size composition may be in accordance with previously known size compositions provided the nanoparticles of an inorganic material are compatible therewith and the resulting composition following inclusion of the inorganic nanoparticles is otherwise capable of functioning as a size for fibrous glass materials. Commonly, the aqueous size composition will also include at least one silane, at least one surfactant or lubricant, and at least one polymeric film-former.

The silanes may be of the reactive type, the non-reactive type, or a combination of reactive and non-reactive silanes. Non-reactive hydrophobic silanes are known to inhibit water adsorption at the interface between the glass fibers and a matrix. When a combination of reactive and non-reactive silanes is utilized, the relative quantities of reactive to non-reactive types commonly is in the range of 20:80 to 99:1, and most preferably in the range of 55:45 to 70:30. The silanes of the reactive type serve as coupling agents between the glass fibers and the thermoplastic matrix. The reactive silanes commonly contain a silicone head(s) and a tail(s) containing a functional group or groups that can react with the thermoplastic matrix. These include primary, secondary, or tertiary amines, vinyl, styryl, alkynyl, methacryloyl, acryloxy, epoxy, thio, sulphide, ureido, isocyanate, oxime, ester, aldehyde, and hydroxy moieties in either unprotected or protected form. The silicone head can be substituted with groups such as ethoxy, methoxy, methyldimethoxy, methydiethoxy, isopropoxy, acetoxy, etc. Representative reactive silanes include 3-aminopropyltriethoxysilane, 3-aminopropyldiethoxymethylsilane, 3-aminopropyltrimethoxysilane, N-(2-aminoethyl)-3-aminopropyltrimethoxysilane, N-(2-aminoethyl)-3-aminopropyl-methyldimethoxysilane, (3-glycidoxypropyl)trimethoxysilane, 2-(3,4-epoxycyclohexyl)ethyltrimethoxysilane, 3-isocyanotopropyltriethoxysilane, vinyltrimethoxysilane, 3-ureidopropyltrimethoxysilane, (3-aminopropyl)methyldiethoxysilane, 3-glycidopropyltriethoxysilane, vinyltriacetoxysilane, mercaptopropyltriethoxysilane, 4-amino-3,3-dimethylbutyltriethoxysilane, N-butyl-3-aminopropyltrimethoxysilane, etc. The non-reactive silanes are capable of occupying reactive sites on the glass fibers but do not otherwise chemically react with the thermoplastic polymeric matrix. The non-reactive silanes commonly include silanes that contain aliphatic, aromatic, aliphatic or aromatic fluorinated, halogen, and other functionalities. Representative non-reactive silanes include methyltrimethoxysilane, propyltriethoxysilane, propyltrimethoxysilane, 3,3,3-trifluoropropyltrimethoxysilane, iso-butyltriethoxysilane, octyltriethoxysilane, hexadecyltriethoxysilane, 1,2-bis(trimethoxysilyl)decane, etc. The silane(s) commonly are provided in the alkaline aqueous size composition in a concentration of 0.5% to 75% based on the total solids of the sizing, and preferably in a concentration of 5% to 50% based on the total solids of the size composition. A mixture of two or more silanes can be used.

A surfactant or lubricant commonly is included in the alkaline aqueous size composition to aid in the processing of the fibers during and after application of the size composition. Preferred surfactants or lubricants are the mono- or diesters of a fatty acid or oil reacted with polyethylene glycol, having hydrophilic and lipophilic areas. A preferred surfactant or lubricant of this type is Mapeg® 200 ML PEG (200) ester monolaurate that is commercially available from the BASF Corporation, Mount Olive, N.J., U.S.A. Another preferred surfactant or lubricant is Polyox WSR301 available from the Dow Chemical Company, Midland, Mich., U.S.A. Other representative surfactants or lubricants include those available under the Cat-X and Emery 6717 designations. The surfactants or lubricants commonly are provided in the size composition in a concentration of approximately 0.001 to 25 percent based on the total formulation solids, and preferably in a concentration of approximately 0.001 to 10 percent based on the total formulation solids. In some cases, other sizing components may function as lubricants and/or surfactants and addition of a separate lubricant may be unnecessary.

Additionally, a polymeric film-former that is compatible with the thermoplastic matrix commonly is included in the alkaline aqueous size composition to further aid in the adherence of the nanoparticles to the glass fibers and the glass fibers to the thermoplastic matrix. Such film-formers may be of the non-ionic, cationic, or anionic types. Representative film-formers for polypropylene matrix are provided as modified polypropylene emulsions. Other polymeric matrices are typically served by emulsions of modified or unmodified urethanes, modified or unmodified polyethylenes, modified or unmodified epoxy resins, and dispersions or emulsions of other chemicals, as well as various mixtures thereof. A preferred polymeric film-former is a nonionic emulsion of polypropylene grafted with maleic anhydride that is commercially available from Michelman, Inc. of Cincinnati, Ohio, U.S.A., under the Michem® ME 91735 designation. Other preferred film-formers include Neoxil 777 from DSM of Heerlen, The Netherlands, and PP2-01 or XM10075 from Hydrosize Technologies of Raleigh, N.C., U.S.A. The film formers commonly are provided in the alkaline aqueous size in a concentration of approximately 10 to 95 percent by weight based on the total formulation solids, and preferably in a concentration of 20 to 85 percent by weight based on the total formulation solids.

The alkaline aqueous size composition optionally may include further polymeric emulsion components, adhesion promoters, solvents, emulsifiers, pigments, anti-migration aids, UV absorbers, biocides, colorants, dyes, anti-static agents, antioxidants, HALS, processing aids, defoamers, antifoamers, combinations of the above and other components required or preferred for specific applications.

The alkaline aqueous size composition may be applied by any technique capable of coating the fibrous material with the flowable size composition containing the dispersion of inorganic nanoparticles that properly wets the fiber surfaces. In a preferred embodiment, a kiss-roll applicator may be utilized to apply the composition to a continuous multifilament material. Other equipment arrangements suitable for applying the size composition include dipping, spraying, or any other protocol suitable for delivery of the size composition to the glass fibers. Commonly, the alkaline aqueous size composition possesses a viscosity of approximately 1 to 5000 mPa s, and preferably approximately 10 to 1000 mPa s at the time of its application to the continuous glass fibers.

Commonly, the adhering nanoparticles are provided on the surface of the fibrous material in a concentration of approximately 1 to 75 percent by weight based on the weight of the total sizing solids following the removal of the aqueous component, and preferably in a concentration of approximately 10 to 40 percent by weight. One has the option of utilizing a lesser overall quantity of the alkaline aqueous size composition when compared to size compositions of the prior art. The uniform and intimate coating of the surfaces of the fibrous material can be promoted by the adjustment of filament contact angles, adjustment of coating roll speeds, applicator roll dimensions and/or their composition, fiber pull speeds, pressure and throughput of the pot sprays, air flow, contents of the size composition, etc. Such coating parameters may vary widely depending on the forming and processing needs and preferences and are known by those skilled in the art.

In a preferred embodiment, the fibrous material (e.g., continuous glass fibers) bearing the adhering nanoparticles of an inorganic material are optionally cut into discontinuous lengths while retaining the roughened surfaces of the fibrous material as the result of the continued presence of the attached nanoparticles of an inorganic material. Such discontinuous lengths commonly measure approximately 2 to 100 mm, and preferably approximately 3 to 50 mm, and are well suited for serving as improved fibrous reinforcement in a thermoplastic matrix material. Any conventional fiber chopping equipment can be utilized. For instance, choppers manufactured by Finn and Fram, Inc. of San Fernando, Calif., U.S.A. may be used.

The aqueous portion of the alkaline aqueous size composition is removed via drying and the nanoparticles of the inorganic material are caused to adhere to the surface of the fibrous material to provide finely roughened surfaces as the result of the presence of the nanoparticles of an inorganic material. Such removal of the aqueous portion of the size composition conveniently can be accomplished by the volatilization of water in a heated oven. Representative oven temperatures commonly are approximately 50 to 300° C., and preferably are approximately 100 to 250° C. Infrared, microwave power, or other methods can also be utilized to dry the fibers. In such cases, the temperature may be below or above the above mentioned ranges.

Alternatively in a further embodiment, continuous filaments may be collected using a winder and subjected to the drying and optional chopping processes at later time, even immediately before incorporation in the thermoplastic matrix material. When collecting rovings of continuous filaments the order of the drying and the optional chopping steps may be reversed.

The fibrous material having a finely roughened surface as a result of the presence of the nanoparticles of an inorganic material is next incorporated within a thermoplastic matrix material. Such thermoplastic matrix material commonly is polymeric in nature and becomes molten or is otherwise rendered melt processable when exposed to heat and returns to its original condition when cooled to room temperature. Representative thermoplastic polymeric matrix materials include melt processible polyolefins, polyesters, polyamides, polycarbonates, polyethers, liquid crystal polymers, polyethersulfones, polyphenylene oxide, polyphenylene sulfide, polybenzimidazoles, thermoplastic polyurethanes, etc. Representative polyolefins include polypropylene and polyethylene. Representative polyesters include polyethylene terephthalate and polybutylene terephthalate. Representative polyamides include nylon 6 and nylon 6,6. Polymers and copolymers, such as polystyrene, polymers of styrene-maleic anhydride or styrene-maleic acid, polymers of acrylonitrile-butadiene-styrene, polymers of styrene acrylonitrile, polyetheretherketones, thermoplastic polyurethanes, and polymers of acrylonitrile, when melt processible may be utilized. Blends of thermoplastic melt processible thermoplastics also can serve as the matrix material. The thermoplastic matrix material optionally may be asphalt.

A preferred thermoplastic matrix material is polypropylene homopolymer or copolymer with Melt Flow Indices (MFI) between 1 and 100, but higher or lower MFI may be used according to the particular preferences or requirements. Exemplary polypropylenes include Fortilene HB1801 from BP, Profax 6523 from Basell, or LGF8000 from Dow Chemical. The addition of a coupling agent such as polypropylene grafted with maleic anhydride (such as Polybond 3200 from Crompton or Exxelor PP1020 from Exxon Mobil) may also be included. Other processing additives may also be included in the matrix.

The incorporation of the fibrous material having a finely roughened surface as the result of the presence of nanoparticles commonly may be accomplished by blending while using conventional extrusion equipment, such as twin or single-screw extruder with co- or counter-rotating screws. As a result of such blending, a material suitable for injection or compression molding is formed.

A fiber-reinforced thermoplastic composite articles may be formed by any one of the variety of molding techniques wherein the fibrous material having a finely roughened surface is incorporated within the continuous phase of a thermoplastic matrix. During such molding step, molding temperatures are selected which correspond to a temperature at which the thermoplastic matrix is melt processable.

Representative thermal techniques to form thermoplastic fiber-reinforced composite articles which include as fibrous reinforcement the surface-roughened fibrous material in accordance with the concept of the present invention include compression molding, injection molding, and long-fiber molding technology. In accordance with the long-fiber technology the compounding is conducted in-line with injection or compression molding. For instance, granular long-fiber technology (G-LFT) can be utilized in which surface-roughened filaments are incorporated in the thermoplastic matrix material, are cooled, and then are pulled into a chopper where they are cut into molding pellets. Alternatively, direct long-fiber technology (D-LFT) can be utilized in which in-line compounding of the surface-roughened filaments are directly integrated into the molding or part-extrusion process. This achieves cost, time and processing savings by integrating the compounding step into the final molding operation. An intermediate solidification and remelting of the thermoplastic matrix material is thereby eliminated. It will be recognized by those skilled in the art that the use of long-fiber technology has the ability to introduce anisotropic material properties within the resulting fiber-reinforced composite articles which are particularly useful in specialized applications. Also, in accordance with the long-fiber technology fibrous reinforcement of a greater length commonly is made possible in the final fiber-reinforced composite article which further enhances the mechanical properties thereof.

When polypropylene of the Profax 6523 type (Melt Flow Index of 4) is utilized as the thermoplastic polymeric matrix material, molding temperatures of approximately 180° C. to 250° C. commonly are employed. Quality glass fiber-reinforced composite articles can be formed in a variety of configurations while using conventional or specialized injection or compression molding equipment. Representative molded articles include automotive or appliance parts or housings, etc.

The enhancement of mechanical properties displayed by the molded articles formed in accordance with the present invention makes possible improved service qualities during use. For instance, properties such as tensile strength, notched and unnotched Izod impact strength, notched and unnotched Charpy impact strength, modulus, and flexural strength may be improved over similarly prepared fiber-reinforced composite articles wherein the discontinuous glass fiber reinforcement following injection or compression molding lacks roughened surfaces as the result of the presence of nanoparticles of an inorganic material which are provided as described herein. Additionally, it is found that the fiber-reinforced composite articles of the present invention commonly possess improved initial color as well as improved color following aging. It is a further economic advantage of the present invention that one has the option of utilizing a lesser overall quantity of the alkaline aqueous size composition when compared to size compositions of the prior art. The mechanism whereby the presence of the nanoparticles of an inorganic material on the discontinuous glass fibers serves to make possible such combination of benefits is considered to be complex and incapable of simple explanation. It is believed, however, that such benefits are achieved in part by improved mechanical interlocking of the discontinuous glass fibers to the thermoplastic matrix material. Also, the surface healing of minor imperfections which inherently are present in the surfaces of the fibrous material by the nanoparticles of an inorganic material may be achieved. The mechanism whereby improved color (i.e. lower color) additionally is achieved in the resulting discontinuous fiber-reinforced composite articles is totally unknown.

The following Examples are presented to provide specific representative embodiments of the present invention. It should be understood however, that the invention is not limited to the specific details set forth in the Examples.

EXAMPLE I

An aqueous dispersion of colloidal silica available from Eka Chemicals, Inc. under the Bindzil® 830 designation was selected as the source of the nanoparticles of an inorganic material. Such nanoparticles were amorphous and generally spherical in configuration, possessed a specific surface area of approximately 300 $m^2/g$, and an average particle size of approximately 10 nm.

To 827 g of water were added under agitation 110 g of Michem® ME91735 polypropylene grafted with maleic anhydride emulsion serving as a film-former available from Michelman, Inc., 18 g of A-1100 γ-aminopropyltriethoxysilane reactive silane coupling agent commercially available from Momentive Performance Materials, Witton, Conn., U.S.A., 1.6 grams of Mapeg® 200 ML PEG (200) ester monolaurate surfactant or lubricant commercially available from the BASF Corporation, 43 grams of the alkaline aqueous dispersion of silica nanoparticles, and 0.1 gram of DEE FO PI-35 polysiloxane-based defoamer in neat form and commercially available from Ultra Additives of Bloomfield, N.J., U.S.A. The resulting aqueous size composition possessed an alkaline pH of 10.5. The silica nanoparticles present in the alkaline aqueous size composition had a concentration of approximately 20 percent, the polymeric film-former was provided in a concentration of approximately 60 percent, the reactive silane coupling agent was provided in an effective concentration of approximately 18 percent achieved after in-situ hydrolysis, and the surfactant and defoamer were provided in a total concentration of approximately 2 percent; all based on weight of total solids in the composition.

A kiss-roll applicator with a circumference of 45 cm operating at a speed of approximately 40 revolutions per minute was used to apply as an intimate coating the alkaline aqueous size composition containing the dispersion of silica nanoparticles to a roving of E-glass. The roving consisted of approximately 4,000 continuous glass filaments each having an average single filament diameter of approximately 13.5 μm.

The continuous glass fibers roving bearing such nanoparticles on the filament surfaces was passed at a rate of approximately 20 meters per second to a chopper operating at a rate of approximately 130 cuts per second to form modified discontinuous glass fibers while retaining the presence of the nanoparticles on the glass fiber surfaces. The resulting discontinuous fibers were cut to average lengths of approximately 5 mm.

The resulting chopped glass fibers bearing a coating of the aqueous alkaline size composition were passed through an oven set at 190° C. where the aqueous portion of the composition was removed through volatilization resulting in the further adherence of the silica nanoparticles to the surfaces of the glass filaments to yield finely roughened filament surfaces as the result of the presence of the nanoparticles. Following such drying, the silica nanoparticles were present in the sized fibreglass in a concentration of approximately 20 percent by weight based on the weight of the total sizing solids.

The discontinuous glass fibers having finely roughened surfaces as the result of the presence of the nanoparticles following drying were incorporated through blending in a polypropylene thermoplastic matrix material by extrusion using a twin-screw extruder. The polypropylene matrix material was of a polypropylene homopolymer with Melt Flow Index of 4, and was commercially available from Basell of Frankfurt, Germany, under the Profax 6523 designation.

Pellets of the matrix material suitable for melt processing having dimensions of approximately 2 mm to 5 mm were formed from the resulting blend by the use of a standard pelletizer. Such pellets then were injection molded using a molding machine at a temperature of approximately 200° C. to form discontinuous fiber-reinforced composite articles. Any extruder, pelletizer, or molding machines suitable for processing of reinforced thermoplastic materials can be used for such process.

The resulting injection molded articles were subjected to physical testing and their properties were compared to similarly prepared fiber-reinforced composite articles in which nanoparticle roughening was absent on the discontinuous fiber surfaces. A comparison of the physical properties is set forth in Table 1 which follows. The loss on ignition (LOI) is with respect to the surface-roughened discontinuous fibers prior to incorporation in the thermoplastic matrix.

TABLE 1

| Property | With Nanoparticles | Without Nanoparticles |
| --- | --- | --- |
| Fiber Diameter | 13.6 μm | 13.5 μm |
| Loss on Ignition (LOI) | 0.57% | 0.66% |
| Tensile Strength-Initial (ASTM D638) | 76 MPa | 72 MPa |
| Tensile Strength With Aging (10 days in 95° C. water) | 57 MPa | 57 MPa |
| Flexural Modulus (ASTM D790) | 3.8 GPa | 3.8 GPa |
| Yield | 198 MPa | 182 MPa |
| Flexural Strength (ASTM D790) | 122 MPa | 112 MPa |
| Initial Color (b value) (Using Colorimeter) | 7.1 | 10.4 |
| Color (b value) With Aging (24 h at 150° C.) | 8.7 | 13.3 |
| Unnotched Charpy Impact (ASTM D6110) | 53 kJ/m$^2$ | 45 kJ/m$^2$ |
| Notched Charpy Impact | 10.5 kJ/m$^2$ | 8.5 kJ/m$^2$ |
| Unnotched Izod Impact (ASTM D256) | 637 J/m | 613 J/m |
| Notched Izod Impact | 196 J/m | 184 J/m |

As indicated, a number of physical properties in the resulting injection molded discontinuous fiber-reinforced composition articles including color were enhanced when practicing the present invention. Both the product of the present invention and that obtained using the control size yielded good strand integrity.

EXAMPLE II

An aqueous dispersion of colloidal silica available from Grace Davison of Columbia, Md., U.S.A., under the Ludox® SM designation was selected as the source of nanoparticles of inorganic material. Such nanoparticles possessed a specific surface area 350 m$^2$/g, and the aqueous dispersion of colloidal silica was included in the alkaline aqueous size composition in a concentration of 15.0 percent by weight.

The additional components of alkaline aqueous size composition were 64.9 percent of Hydrosize® PP2-01 functionalized polypropylene aqueous dispersion available from Hydrosize Technologies, Inc. of Raleigh, N.C., U.S.A., serving as a film former, 17.5 percent of A-1100 γ-aminopropyl-triethoxysilane reactive silane coupling agent available from Momentive Performance Materials, 2.5 percent Mapeg® 200 ML PEG (200) ester monolaurate surfactant or lubricant available from BASF Corporation, and 0.1 percent of DEE FO P1-35 polysiloxane-based defoamer available from Ultra Additives. The alkaline aqueous size composition possessed a solids content of 6.5 percent and an alkaline pH of 10.3. The resulting alkaline aqueous size composition containing a dispersion of colloidal silica was applied through the use of a kiss-roll applicator to a multifilamentary roving of 4,000 E-glass filaments each having a diameter of approximately 16 μm, and was dried to produce a roughened surface on the continuous glass filaments as a result of the presence of the silica nanoparticles. The loss on ignition (LOI) of the resulting surface-roughened glass roving was 0.6 percent.

The glass filamentary roving bearing the nanoparticle-roughened surface was passed together with molten polypropylene through a Leistritz ZSE 40 GL twin-screw extruder that was equipped with screws designed to minimize damage to the surface-roughened glass fibers. As the multifilamentary glass roving passed through the extruder it was well admixed with the molten polypropylene intended to serve as the continuous matrix phase of a fiber-reinforced composite article.

The resulting thermoplastic polymer-impregnated roving next was passed in the absence of the appreciable cooling to a cutter to form partially solidified large pellets suitable for molding. The fibrous reinforcement was primarily unidirectionally aligned within the resulting pellets.

The resulting large pellets containing the surface-roughened glass fibers in the absence of any substantial cooling were next placed in a mold and were compression molded in a Dieffenbacher molding machine having a capacity of 5000 kN to form a fiber-reinforced composite article in sheet form containing primarily unidirectionally aligned glass fibers as reinforcement within a continuous matrix of polypropylene.

The above procedure was repeated with the exception that the alkaline aqueous size composition that was coated on the glass roving lacked the silica nanoparticles and the Mapeg®

200 ML PEG (200) surfactant and lubricant which had been included as a processing aid. In the aqueous dispersion the reactive silane coupling agent was provided in the same 17.5 percent concentration, the concentration of the aqueous dispersion of functionalized polypropylene film-former was increased to 82.4 percent, and the polysiloxane-based defoamer was present in the same 0.1 percent concentration. The alkaline aqueous size composition possessed a solids content of 6.3 percent, and an alkaline pH of 10.1. The loss on ignition (LOI) of the resulting glass roving was 0.5 percent.

Representative test specimens were water-jet cut from the compression molded sheets, and the physical properties of such compression molded fiber-reinforced composite articles were evaluated while using the test procedures of the International Organization for Standardization (ISO). The results of such evaluation are reported hereafter. A comparison of the physical properties is set forth in Table 2 which follows.

TABLE 2

| Property | With Nanoparticles | Without Nanoparticles |
| --- | --- | --- |
| Fiber Diameter | 16 μm | 16 μm |
| Loss on Ignition (LOI) | 0.6% | 0.5% |
| Tensile Strength (Transverse) | 40 MPa | 41 MPa |
| Tensile Strength (Longitudinal) | 96 MPa | 99 MPa |
| Unnotched Izod Impact (Transverse) | 279 J/m | 286 J/m |
| Unnotched Izod Impact (Longitudinal) | 477 J/m | 461 J/m |
| Notched Izod Impact (Transverse) | 105 J/m | 94 J/m |
| Notched Izod Impact (Longitudinal) | 288 J/m | 158 J/m |
| Multi-Axial Impact | 26 J | 26 J |

It will be recognized that disparities between the transverse and longitudinal test results are attributable to the general alignment of the fibrous reinforcement within the resulting fiber-reinforced test specimens. As indicated, physical properties such as the Notched Izod Impact are shown to be significantly enhanced when practicing the concept of the present invention through the use of inorganic nanoparticle roughening on the surface of the fibrous reinforcement present within the thermoplastic matrix.

EXAMPLE III

An aqueous dispersion of colloidal silica available from Eka Chemicals, Inc. under the designation of Bindzil® 215 designation was selected as the source of nanoparticles of inorganic material. Such nanoparticles possessed a specific surface area 600 m²/g, and the aqueous dispersion of colloidal silica was included in the alkaline aqueous size composition in a concentration of 15.0 percent.

The additional components of alkaline aqueous size composition were 64.9 percent of Michem® ME 91735 polypropylene grafted with maleic anhydride emulsion available from Michelman, Inc., serving as a film former, 17.5 percent of A-1100 γ-aminopropyltriethoxysilane reactive silane coupling agent available from Momentive Performance Materials, 2.5 percent Mapeg® 200 ML PEG (200) ester monolaurate surfactant or lubricant available from BASF Corporation, and 0.1 percent of DEE FO PI-35 polysiloxane-based defoamer available from Ultra Additives. The alkaline aqueous size composition possessed a solids content of 6.3 percent and pH of 10.9. The resulting alkaline aqueous size composition containing a dispersion of colloidal silica was applied through the use of a kiss-roll applicator to a multifilamentary roving of 4,000 E-glass filaments each having a diameter of approximately 16 μm, and was dried to produce a roughened surface on the continuous glass filaments as a result of the presence of the silica nanoparticles. The loss on ignition (LOI) of the resulting surface-roughened glass roving was 0.5 percent.

The glass filamentary roving bearing the nanoparticle-roughened surface was passed together with molten polypropylene through a Leistritz ZSE 40 GL twin-screw extruder that was equipped with screws designed to minimize damage to the surface-roughened glass fibers. As the multifilamentary glass roving passed through the extruder it was well admixed with the molten polypropylene intended to serve as the continuous matrix phase of a fiber-reinforced composite article.

The resulting thermoplastic polymer-impregnated roving next was passed in the absence of the appreciable cooling to a cutter to form partially solidified large pellets suitable for molding. The fibrous reinforcement was primarily unidirectionally aligned within the resulting pellets.

The resulting large pellets containing the surface-roughened glass fibers in the absence of any substantial cooling were next placed in a mold and were compression molded in a Dieffenbacher molding machine having a capacity of 5000 kN to form a fiber-reinforced composite article in sheet form containing primarily unidirectionally aligned glass fibers as reinforcement within a continuous matrix of polypropylene.

The above procedure was repeated with the exception that the alkaline aqueous size composition that was coated on the glass roving lacked the silica nanoparticles and the Mapeg® 200 ML PEG (200) surfactant and lubricant which had been included to well disperse the silica nanoparticles as a processing aid. In the aqueous dispersion the reactive silane coupling agent was provided in the same 17.5 percent concentration, the concentration of the emulsion of polypropylene grafted with maleic anhydride film-former was increased to 82.4 percent, and the polysiloxane-based defoamer was present in the same 0.1 percent concentration. The alkaline aqueous size composition possessed a solids content of 6.4 percent, and an alkaline pH of 10.9. The loss on ignition (LOI) of the resulting glass roving was the same 0.5 percent.

Representative test specimens were water-jet cut from the compression molded sheets, and the physical properties of such compression molded fiber-reinforced composite articles were evaluated while using the test procedures of the International Organization for Standardization (ISO). The results of such evaluation are reported hereafter. A comparison of the physical properties is set forth in Table 3 which follows.

TABLE 3

| Property | With Nanoparticles | Without Nanoparticles |
| --- | --- | --- |
| Fiber Diameter | 16 μm | 16 μm |
| Loss on Ignition (LOI) | 0.5% | 0.5% |
| Tensile Strength (Transverse) | 39 MPa | 39 MPa |
| Tensile Strength (Longitudinal) | 88 MPa | 98 MPa |
| Unnotched Izod Impact (Transverse) | 295 J/m | 334 J/m |
| Unnotched Izod Impact (Longitudinal) | 472 J/m | 431 J/m |
| Notched Izod Impact (Transverse) | 141 J/m | 101 J/m |
| Notched Izod Impact (Longitudinal) | 235 J/m | 212 J/m |
| Multi-Axial Impact | 26 J | 23 J |

It will be recognized that similar disparities between the transverse and longitudinal test results are attributable to the general alignment of the fibrous reinforcement within the resulting fiber-reinforced test specimens. As indicated, physical properties such as the Notched Izod Impact are again shown to be significantly enhanced when practicing the concept of the present invention through the use of inorganic nanoparticle roughening on the surface of the fibrous reinforcement present within the thermoplastic matrix.

The principles, preferred embodiments, and modes of operation of the present invention have been described in the foregoing specification. The invention which is protected herein, however, is not to be construed as being limited to the particular forms disclosed, since these are to be regarded as being illustrative rather than restrictive. Variations and changes may be made by those skilled in the art without departing from the spirit of the invention.

We claim:

1. A process for forming a fiber-reinforced thermoplastic composite article, the process comprising:
   (a) applying as a coating to the surface of glass fibers an alkaline aqueous size composition comprising:
       a dispersion of nanoparticles of an inorganic material,
       a polymeric film-former, and
       a combination of silanes comprising at least one reactive silane and at least one non-reactive silane,
   wherein the nanoparticles are in a concentration of about 10 to 40 percent by weight based on the weight of total sizing solids in the size composition,
   (b) drying said coating present on said glass fibers to aid in adherence of the nanoparticles onto said glass fibers and provide a roughened surface on said glass fibers,
   (c) incorporating said glass fibers bearing said roughened surface in a thermoplastic matrix as fibrous reinforcement with the application of heat whereby said thermoplastic matrix is rendered melt processable, wherein the at least one reactive silane couples the glass fibers to the thermoplastic matrix, and
   (d) forming a fiber-reinforced composite article with the reinforced thermoplastic matrix, wherein the composite comprises a Notched Izod impact strength that is greater than a composite formed without the nanoparticles.

2. The process according to claim 1, wherein step (c) forms a long-fiber-reinforced thermoplastic composite article.

3. The process of claim 1, wherein said fibrous material is in the form of a multifilamentary roving.

4. The process of claim 1, wherein said alkaline aqueous size of composition possesses a pH of approximately 7.5 to 13.

5. The process of claim 1, wherein said nanoparticles of an inorganic material possess an average particle size of approximately 3 to 40 nm.

6. The process of claim 1, wherein said nanoparticles of an inorganic material possess an average particle size of approximately 3 to 10 nm.

7. The process of claim 1, wherein said nanoparticles of an inorganic material are silica.

8. The process according to claim 1, wherein the Notched Izod impact strength is about 6.5% greater than the composite formed without the nanoparticles.

9. The process of claim 1, wherein the Notched Izod impact strength is measured in a longitudinal direction and is about 10.8% greater than the composite formed without the nanoparticles.

10. The process according to claim 1, wherein the Notched Izod impact strength is measured in a longitudinal direction and about 82.3% greater than the composite formed without the nanoparticles.

11. The process for forming a fiber-reinforced thermoplastic composite article according to claim 1, wherein said nanoparticles of an inorganic material are selected from the group consisting of silica, clay, glass, metals, titanium dioxide, zinc oxide, barium oxide, cerium gadolinium oxide, iron ferrite, aluminum polyphosphate, nanodiamonds, and mixtures of the foregoing.

12. The process for forming a fiber-reinforced thermoplastic composite article according to claim 1, wherein in step (a) the nanoparticles of said inorganic material are caused to adhere to said fibrous material by initially coating said alkaline aqueous size composition on the surfaces of said fibrous material followed by removal of volatile materials.

13. The process for forming a fiber-reinforced thermoplastic composite article according to claim 1, wherein said thermoplastic matrix of step (c) comprises a thermoplastic selected from the group consisting of polyolefins, polyesters, polyamides, polycarbonates, polyethers, liquid crystal polymers, polyethersulfones, polyphenylene oxide, polyphenylene sulfide, polybenzimidazoles, thermoplastic polyurethanes, and blends of the foregoing.

14. The process for forming a fiber-reinforced thermoplastic composite article according to claim 1, wherein said thermoplastic matrix comprises polypropylene.

15. The process according to claim 1, wherein the polymeric film-former is present at a concentration of 20 to 85 percent by weight of the total solids of the alkaline aqueous size composition.

16. A process for forming a discontinuous glass fiber-reinforced thermoplastic composite article, the process comprising:
   (a) adhering nanoparticles of an inorganic material that are dispersed in an alkaline aqueous size composition to the surfaces of glass fibers which are present in continuous form so as to provide finely roughened surfaces on said continuous glass fibers as the result of the presence of said nanoparticles of said inorganic material, said adhering conducted by drying, wherein the alkaline aqueous size composition comprises:
       a combination of silanes that includes at least one reactive silane and at least one non-reactive silane, and
       a polymeric film-former, wherein the polymeric film-former aids in adherence of the nanoparticles onto the glass fibers, and
   wherein the nanoparticles are in a concentration of about 10 to 40 percent by weight based on the weight of total sizing solids in the size composition,
   (b) cutting said continuous glass fibers into discontinuous lengths while retaining said roughened surfaces on said glass fibers as the result of the presence of said nanoparticles of said inorganic material,
   (c) extruding the discontinuous glass fibers having said finely roughened surfaces together with a thermoplastic wherein the surface-attached nanoparticles of inorganic material serve to promote the secure bonding of the discontinuous glass fibers within said thermoplastic matrix to form a material suitable for molding and wherein the at least one reactive silane couples the discontinuous glass fibers to the thermoplastic matrix, and
   (d) injection or compression molding said material suitable for molding to form a fiber-reinforced composite article which displays an enhanced mechanical property comprising a Notched Izod impact strength that is greater than a composite formed without the nanoparticles.

17. The process for forming a discontinuous glass fiber-reinforced thermoplastic composite article according to claim 16, wherein said continuous glass fibers of step (a) are selected from the group consisting of E-glass, C-glass, A-glass, AR-glass, D-glass, R-glass, S-glass, and mixture of the foregoing, and possess a diameter of approximately 2 to 50 microns.

18. The process for forming a discontinuous glass fiber-reinforced thermoplastic composite article according to claim 16, wherein said continuous glass fibers of step (a) are E-glass, and possess a diameter of approximately 7 to 30 microns.

19. The process for forming a discontinuous glass fiber-reinforced thermoplastic composite article according to claim 16, wherein said alkaline aqueous size composition possesses a pH of approximately 8 to 11.

20. The process for forming a discontinuous glass fiber-reinforced thermoplastic composite article according to claim 16, wherein said nanoparticles of an inorganic material possess an average particle size of approximately 3 to 40 nm.

21. The process for forming a discontinuous glass fiber-reinforced thermoplastic composite article according to claim 16, wherein said nanoparticles of an inorganic material possess an average particle size of approximately 3 to 10 nm.

22. The process for forming a discontinuous glass fiber-reinforced thermoplastic composite article according to claim 16, wherein said nanoparticles of an inorganic material are selected from the group consisting of silica, clay, glass, metals, titanium dioxide, zinc oxide, barium oxide, cerium gadolinium oxide, iron ferrite, aluminum polyphosphate, nanodiamonds, and mixtures of the foregoing.

23. The process for forming a discontinuous glass fiber-reinforced thermoplastic composite article according to claim 16, wherein said nanoparticles of an inorganic material are silica.

24. The process for forming a discontinuous glass fiber-reinforced thermoplastic composite article according to claim 16, wherein said alkaline size composition of step (a) additionally includes surfactant.

25. The process for forming a discontinuous glass fiber-reinforced thermoplastic composite article according to claim 16, wherein in step (a) the nanoparticles of said inorganic material are caused to adhere to said continuous glass fibers by initially coating said alkaline aqueous size composition on the surfaces of said glass fibers followed by removal of volatile materials.

26. The process for forming a discontinuous glass fiber-reinforced thermoplastic composite article according to claim 16, wherein in step (b) said continuous glass fibers are cut into discontinuous lengths of approximately 2 to 100 mm.

27. The process for forming a discontinuous glass fiber-reinforced thermoplastic composite article according to claim 16, wherein in step (b) said continuous glass fibers are cut into discontinuous lengths of approximately 3 to 50 mm.

28. The process for forming a discontinuous glass fiber-reinforced thermoplastic composite article according to claim 16, wherein said thermoplastic of step (c) is selected from the group consisting of polyolefins, polyesters, polyamides, polycarbonates, polyethers, liquid crystal polymers, polyethersulfones, polyphenylene oxide, polyphenylene sulfide, polybenzimidazoles, thermoplastic polyurethanes, and blends of the foregoing.

29. The process for forming a discontinuous glass fiber-reinforced thermoplastic composite article according to claim 16, wherein said thermoplastic is polypropylene.

30. The process according to claim 16, wherein the Notched Izod impact strength is about 6.5% greater than the composite formed without the nanoparticles.

31. The process according to claim 16, wherein the Notched Izod impact strength is measured in a longitudinal direction and is about 10.8% greater than the composite formed without the nanoparticles.

32. The process according to claim 16, wherein the Notched Izod impact strength is measured in a longitudinal direction and about 82.3% greater than the composite formed without the nanoparticles.

33. The process according to claim 16, wherein the polymeric film-former is present at a concentration of 20 to 85 percent by weight of the total solids of the alkaline aqueous size composition.

34. The process according to claim 16, wherein the polymeric film-former is anionic.

* * * * *